(12) United States Patent
Matsumoto

(10) Patent No.: US 12,276,245 B2
(45) Date of Patent: Apr. 15, 2025

(54) CONTROL DEVICE AND CONTROL METHOD FOR POWER UNIT

(71) Applicant: HONDA MOTOR CO., LTD., Tokyo (JP)

(72) Inventor: Takeshi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/598,708

(22) Filed: Mar. 7, 2024

(65) Prior Publication Data
US 2024/0309836 A1  Sep. 19, 2024

(30) Foreign Application Priority Data

Mar. 15, 2023  (JP) ................ 2023-040730

(51) Int. Cl.
| | |
|---|---|
| F02N 11/08 | (2006.01) |
| H02J 7/00 | (2006.01) |
| H02J 7/14 | (2006.01) |
| B64D 33/00 | (2006.01) |

(52) U.S. Cl.
CPC ........ *F02N 11/0862* (2013.01); *F02N 11/087* (2013.01); *H02J 7/0013* (2013.01); *H02J 7/0048* (2020.01); *H02J 7/0063* (2013.01); *H02J 7/1423* (2013.01); *B64D 33/00* (2013.01); *F02N 2200/061* (2013.01)

(58) Field of Classification Search
CPC ............... F02N 11/0862; F02N 11/087; F02N 2200/061; H02J 7/0013; H02J 7/0048; H02J 7/0063; H02J 7/1423; B64D 33/00
See application file for complete search history.

(56) References Cited

U.S. PATENT DOCUMENTS

| | | | | |
|---|---|---|---|---|
| 2006/0097671 A1* | 5/2006 | Yoshida | ............ | B60K 6/48 |
| | | | | 318/109 |
| 2012/0169291 A1* | 7/2012 | Abe | .............. | H02J 7/0018 |
| | | | | 320/134 |
| 2015/0028788 A1* | 1/2015 | Wai | .............. | H02P 25/0925 |
| | | | | 318/504 |

(Continued)

FOREIGN PATENT DOCUMENTS

| | | | | |
|---|---|---|---|---|
| JP | 2011142704 A | * | 7/2011 | ....... B60L 11/1857 |
| JP | 2021-017874 A | | 2/2021 | |

(Continued)

*Primary Examiner* — Joseph J Dallo
(74) *Attorney, Agent, or Firm* — Rankin, Hill & Clark LLP

(57) ABSTRACT

A control device for a power unit connected to a motor that starts an internal combustion engine, the power unit having a plurality of batteries connected in parallel with each other and which are configured to supply electrical power from the plurality of batteries to an electrical load other than the motor, wherein the control device comprises a detection unit that detects a residual mount of electrical power of each of the plurality of batteries, a comparison unit that compares the residual amount of electrical power of the plurality of batteries, and a starting control unit which, at a time when the internal combustion engine is started, controls the power unit, and thereby starts supplying the electrical power from the plurality of batteries to the motor in a descending order of the residual amount of electrical power of the batteries being larger.

6 Claims, 7 Drawing Sheets

(56) References Cited

U.S. PATENT DOCUMENTS

2015/0340883 A1* 11/2015 Kanai ................... H02J 7/0048
320/118
2016/0332531 A1* 11/2016 Chazal ................. H01M 10/48
2019/0135128 A1* 5/2019 Kim .................... H01M 10/441

FOREIGN PATENT DOCUMENTS

WO    WO-2016180442 A1 * 11/2016 ....... G01R 19/16542
WO    WO-2022208684 A1 * 10/2022 ............ H02J 7/0025

* cited by examiner

FIG. 4

| FIRST CONTROL SIGNAL | OFF | ON | ON |
|---|---|---|---|
| SECOND CONTROL SIGNAL | – | OFF | ON |
| SUPPLY OF ELECTRICAL POWER FROM BATTERIES TO MOTOR | INCAPABLE | INCAPABLE | CAPABLE |

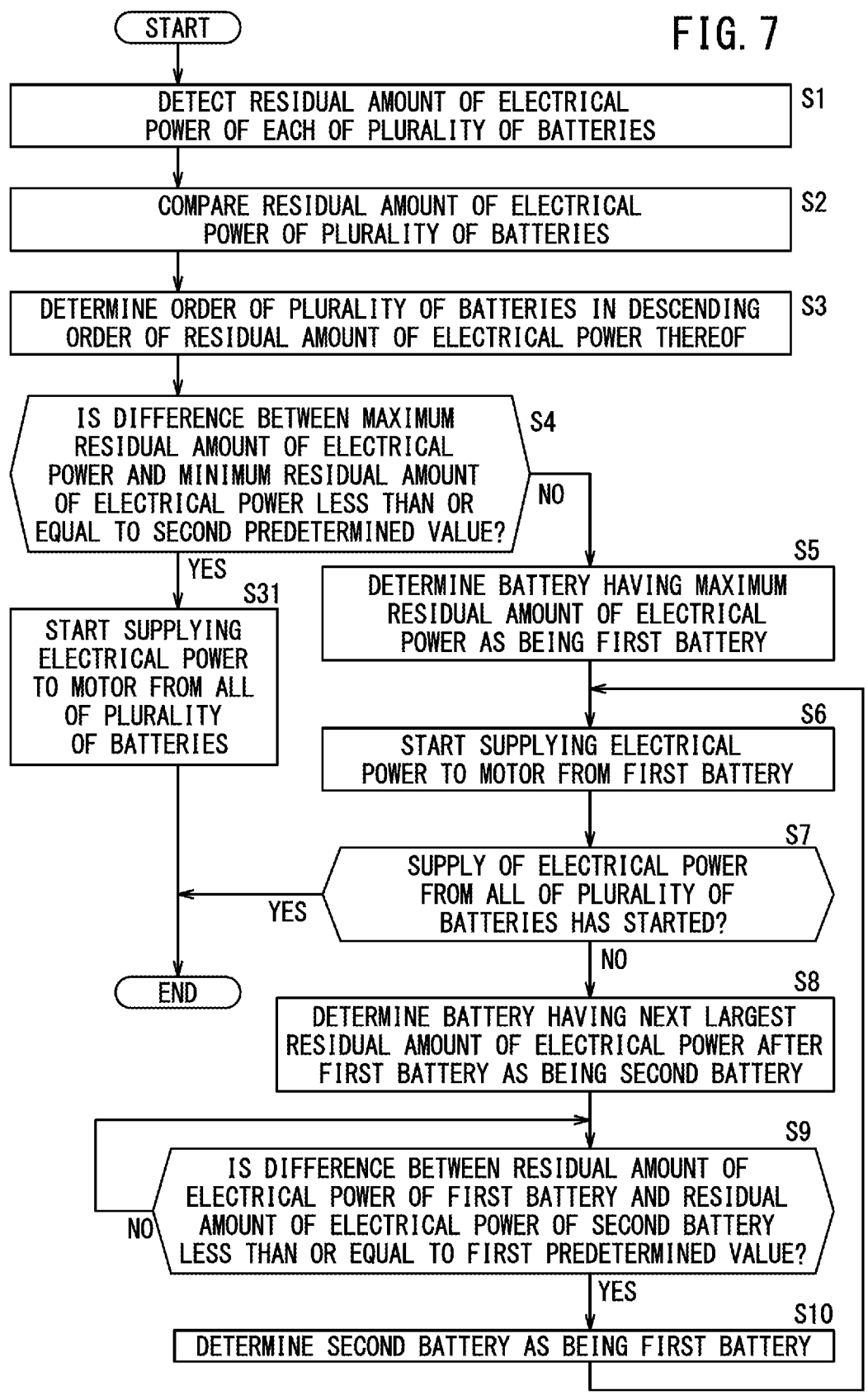

CONTROL DEVICE AND CONTROL METHOD FOR POWER UNIT

CROSS-REFERENCE TO RELATED APPLICATIONS

This application is based upon and claims the benefit of priority from Japanese Patent Application No. 2023-040730 filed on Mar. 15, 2023, the contents of which are incorporated herein by reference.

BACKGROUND OF THE INVENTION

Field of the Invention

The present invention relates to a control device and a control method for a power unit.

Description of the Related Art

In recent years, in order to ensure that more people can have access to affordable, reliable, sustainable, and advanced energy, research and development is being carried out in relation to charging and supplying electrical power for mobility devices equipped with secondary batteries that contribute to energy efficiency.

In JP 2021-017874 A, an engine starting system is disclosed. Such an engine starting system causes an engine to be operated while suppressing the deterioration of lead and lithium-ion batteries.

SUMMARY OF THE INVENTION

In moving bodies equipped with a plurality of batteries, a technology for preventing deterioration and damage to the batteries and the like caused by an electrical current between the batteries has been long awaited.

The present invention has the object of solving the aforementioned problem, and in turn, to contribute to energy efficiency.

A first aspect of the present invention is a control device for a power unit connected to a motor that starts an internal combustion engine, the power unit having a plurality of batteries connected in parallel with each other and which are configured to supply electrical power from the plurality of batteries to an electrical load other than the motor, wherein the control device comprises a detection unit that detects a residual mount of electrical power of each of the plurality of batteries, a comparison unit that compares the residual amount of electrical power of the plurality of batteries, and a starting control unit which, at a time when the internal combustion engine is started, controls the power unit, and thereby starts supplying the electrical power from the plurality of batteries to the motor in a descending order of the residual amount of electrical power of the batteries.

A second aspect of the present invention is a control method for a power unit connected to a motor configured to start an internal combustion engine, the power unit having a plurality of batteries connected in parallel with each other and being configured to supply electrical power from the plurality of batteries to an electrical load other than the motor, the control method comprising a detection step of detecting a residual mount of electrical power of each of the plurality of batteries, a comparison step of comparing the residual amount of electrical power of the plurality of batteries, and a starting control step which, at a time when the internal combustion engine is started, controls the power unit, and thereby starts supplying the electrical power from the plurality of batteries to the motor in a descending order of the residual amount of electrical power of the batteries.

According to the present invention, deterioration and damage to the batteries and the like caused by the electrical current between the batteries can be prevented.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a diagram showing conditions for supplying electrical power to motors from each of respective batteries;

FIG. 7 is a flowchart showing a processing procedure in relation to a control method for the power unit.

DETAILED DESCRIPTION OF THE INVENTION

Figure 1:
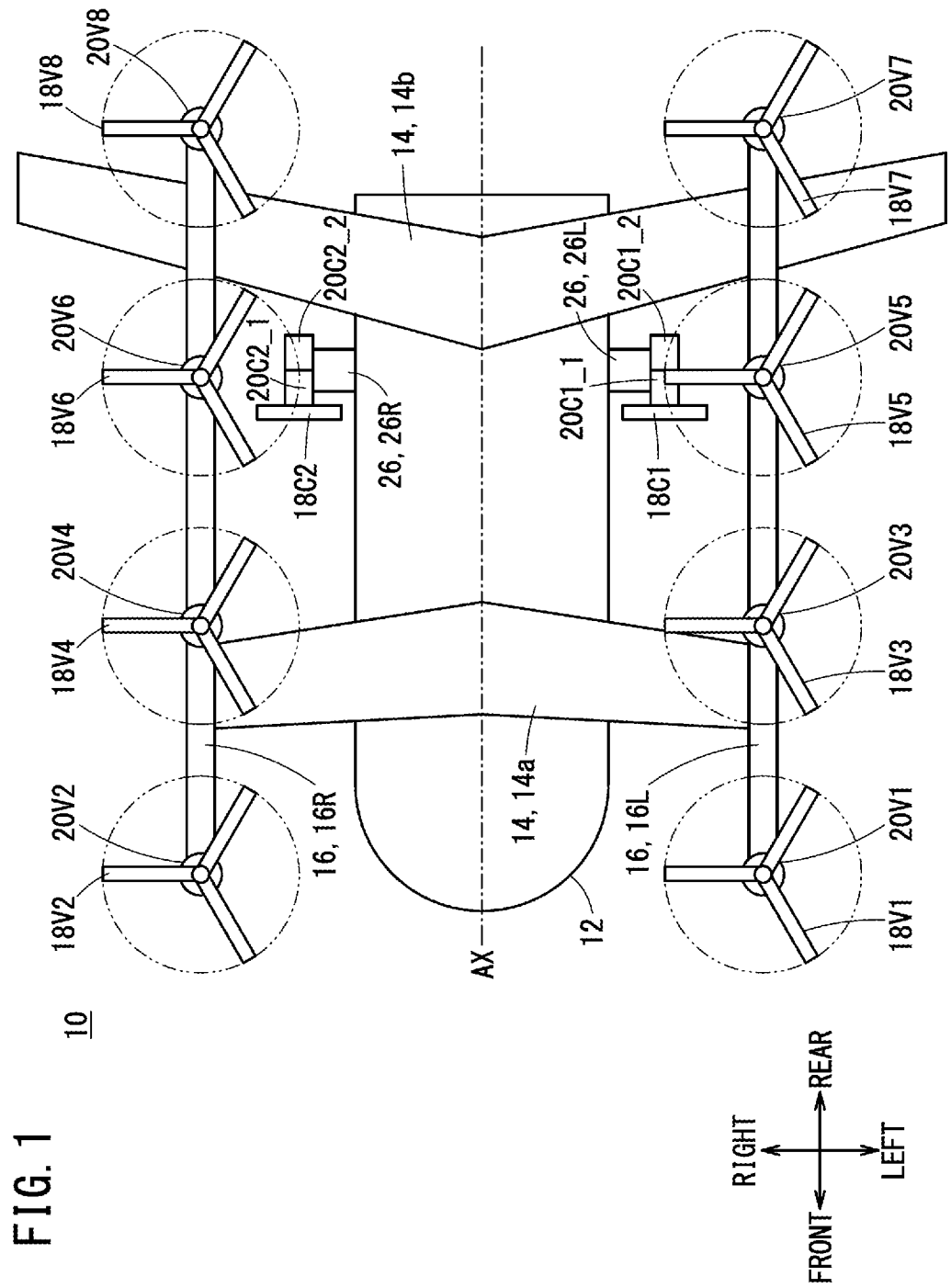
FIG. 1 is a schematic diagram of an aircraft.

A description will be given with reference to the drawings concerning a control device for a power unit according to an embodiment. In the description of the present embodiment, an example of an aircraft is used as a moving body having the control device for the power unit; however, the present invention is not limited to being an aircraft. FIG. 1 is a schematic diagram of an aircraft 10. The aircraft 10 is an electric vertical take-off and landing (eVTOL) aircraft. The aircraft 10 has a fuselage 12. A cockpit, a cabin, and the like are provided in the fuselage 12.

The aircraft 10 is a tandem wing aircraft. The aircraft 10 includes wings 14. The wings 14 include a front wing 14a and a rear wing 14b. The rear wing 14b is a swept wing. In the case that the aircraft 10 moves in a forward direction, lift is generated on each of the front wings 14a and the rear wings 14b. A boom 16L and a boom 16R are installed on the front wing 14a and the rear wing 14b.

The boom 16L extends in a front-rear direction along a center line AX of the fuselage 12. The boom 16L is arranged in a leftward direction with respect to the center line AX of the fuselage 12. The boom 16R extends in a front-rear direction along the center line AX. The boom 16R is arranged in a rightward direction with respect to the center line AX. The boom 16L and the boom 16R are spaced apart from each other in the left-right direction with the fuselage 12 being sandwiched therebetween. In the case that the boom 16L and the boom 16R are not distinguished from each other, they may be simply referred to as booms 16.

The aircraft 10 includes a plurality of rotors 18V. In FIG. 1, as the plurality of rotors 18V, eight rotors 18V1, 18V2, 18V3, 18V4, 18V5, 18V6, 18V7, and 18V8 are illustrated. Each of the rotors 18V is driven by one or a plurality of motors 20V. In FIG. 1, an example is shown in which each of the rotors 18V is driven by one of the motors 20V.

A motor 20V1 is provided with respect to the rotor 18V1. A motor 20V2 is provided with respect to the rotor 18V2. A motor 20V3 is provided with respect to the rotor 18V3. A motor 20V4 is provided with respect to the rotor 18V4. A motor 20V5 is provided with respect to the rotor 18V5. A motor 20V6 is provided with respect to the rotor 18V6. A motor 20V7 is provided with respect to the rotor 18V7. A motor 20V8 is provided with respect to the rotor 18V8.

By the rotors 18V being driven by the motors 20V, thrusts are generated primarily in the vertical direction. The thrusts are controlled by adjusting the rotational speed of the rotors 18V and the pitch angle of the blades of the rotors 18V. By controlling the thrusts in each of the rotors 18V, a propulsive force is generated primarily in an upward direction with respect to the fuselage 12. Each of the rotors 18V is primarily used at a time of vertical takeoff, at a time when transitioning from vertical takeoff to cruising, at a time when transitioning from cruising to vertical landing, at a time of vertical landing, and at a time when coming to a stop in the air, and the like.

Four of the rotors 18V1, 18V3, 18V5, and 18V7 are installed on the boom 16L. Corresponding thereto, four of the motors 20V1, 20V3, 20V5, and 20V7 are also installed on the boom 16L. The remaining four of the rotors 18V2, 18V4, 18V6, and 18V8 are installed on the boom 16R. Corresponding thereto, four of the motors 20V2, 20V4, 20V6, and 20V8 are also installed on the boom 16R.

The aircraft 10 includes a plurality of rotors 18C. In FIG. 1, as the plurality of rotors 18C, two of the rotors 18C1 and 18C2 are illustrated. Each of the rotors 18C is driven by one or a plurality of motors 20C. In FIG. 1, an example is shown in which each of the rotors 18C is driven by two of the motors 20C. The motors 20C1_1 and 20C1_2 are provided with respect to the rotor 18C1. The motors 20C2_1 and 20C2_2 are provided with respect to the rotor 18C2.

Mounts 26 (a mount 26L and a mount 26R) are installed on side surfaces of the fuselage 12. The mount 26L extends in a leftward direction from a left side surface of the fuselage 12. The mount 26R extends in a rightward direction from a right side surface of the fuselage 12. The rotor 18C1 is installed on the mount 26L together with the motors 20C1_1 and 20C1_2. The rotor 18C2 is installed on the mount 26R together with the motors 20C2_1 and 20C2_2. It should be noted that each of the rotors 18C may be installed on the fuselage 12 more rearwardly than the rear wing 14b.

By the rotors 18C being driven by the motors 20C, thrusts are generated primarily in the horizontal direction. The thrusts are controlled by adjusting the rotational speed of the rotors 18C and the pitch angle of the blades of the rotors 18C. By controlling the thrusts in each of the rotors 18C, a propulsive force is generated primarily in a forward direction with respect to the fuselage 12. Each of the rotors 18C is primarily used at a time when transitioning from vertical takeoff to cruising, at a time when cruising, and at a time when transitioning from cruising to vertical landing.

The aircraft 10 includes a generator that serves as an electrical power source for electrical loads such as the aforementioned plurality of motors 20V and the plurality of motors 20C and the like. In the present embodiment, another motor that generates electrical power by means of motive power, which is obtained from a later-described internal combustion engine, functions as a generator. The aircraft 10 is a hybrid aircraft. For this purpose, the aircraft 10 further includes batteries that will be described later. In the case that the electrical power generated by the motor that functions as a generator is insufficient with respect to the required amount of electrical power, the electrical power of the batteries is also supplied to the electrical load.

Figure 2:
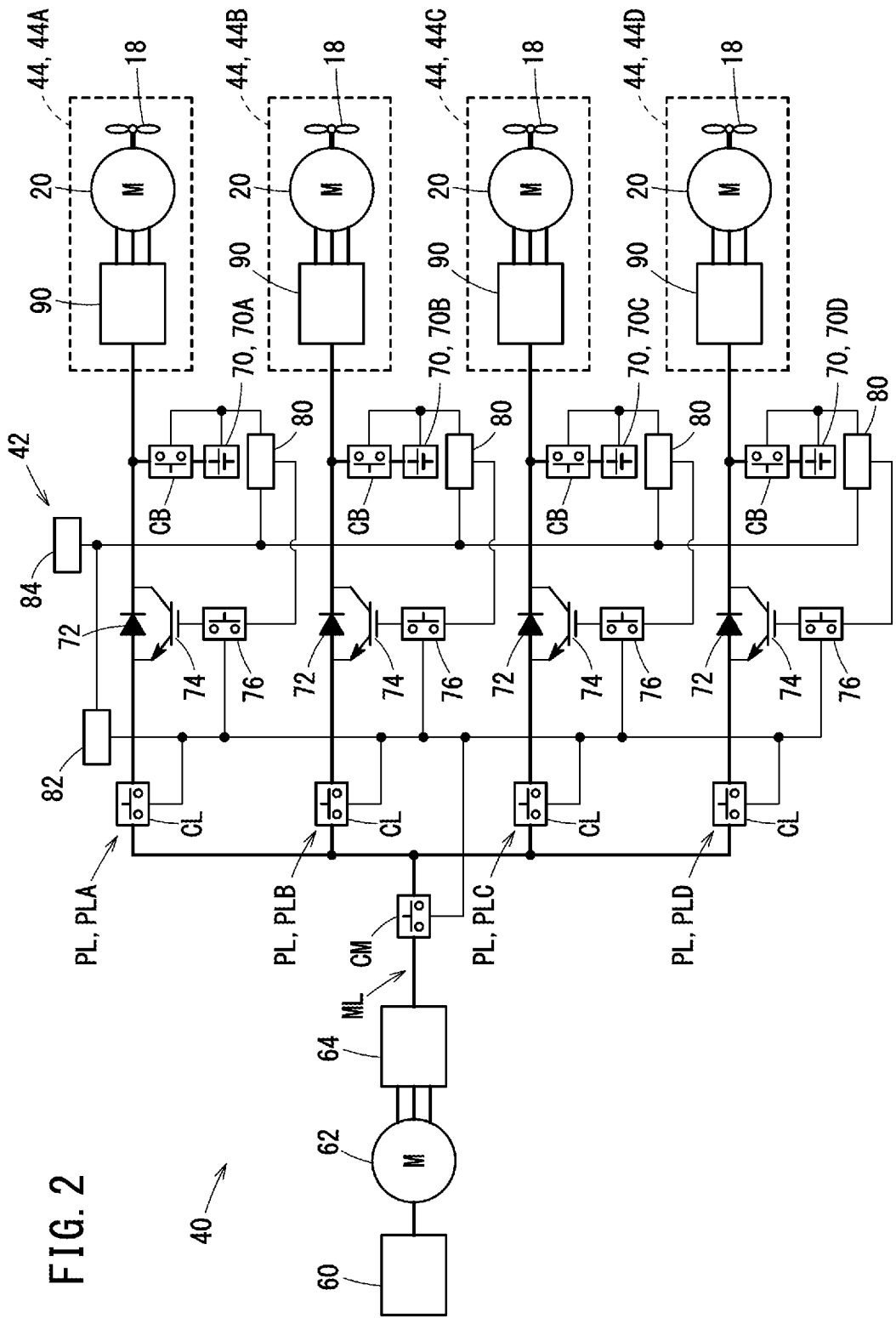
FIG. 2 is a schematic diagram showing the configuration of a power unit and a control device therefor included in the aircraft.

FIG. 2 is a schematic diagram showing the configuration of a power unit 40 and a control device 42 therefor included in the aircraft 10. The control device 42 controls the power unit 40, and thereby permits or prohibits the supply of electrical power to the electrical loads 44.

The power unit 40 is equipped with an internal combustion engine 60, a motor 62, and a converter 64. In the example shown in FIG. 2, the power unit 40 includes one set of the internal combustion engine 60, the motor 62, and the converter 64. However, the power unit 40 may include a plurality of sets of the internal combustion engine 60, the motor 62, and the converter 64. Further, in the case that the power unit 40 is not equipped with the internal combustion engine 60, the motor 62, and the converter 64, the internal combustion engine 60, the motor 62, and the converter 64 may be provided separately from the power unit 40.

The internal combustion engine 60, for example, is a gas turbine. The motor 62 generates electricity using the motive power obtained from the internal combustion engine 60. The converter 64 converts AC electrical power obtained by the electrical power generation of the motor 62 into DC electrical power. The electrical power, which is generated by the motor 62 and converted by the converter 64, is supplied to the electrical loads 44. Further, a portion of such electrical power can also be used to charge a later-described plurality of batteries 70 inside the power unit 40.

Moreover, at a time when the internal combustion engine 60 is started, the motor 62 starts the internal combustion engine 60. More specifically, after the internal combustion engine 60 has been started, the motor 62 that starts the internal combustion engine 60 functions as a generator that serves as an electrical power source for the plurality of batteries 70 or the electrical loads 44. Accordingly, since there is no need to provide the motor 62 separately from the generator for starting the internal combustion engine 60, it is possible to reduce the size and scale as well as the weight of the moving object such as the aircraft 10 or the like.

The power unit 40 includes an electrical power supply line ML connected to the motor 62, and a plurality of electrical power supply lines PL that are branched off from the electrical power supply line ML. Each of the plurality of electrical power supply lines PL is connected to each of a plurality of electrical loads 44. In the example shown in FIG. 2, each of four electrical power supply lines PLA, PLB, PLC, and PLD is connected to each of four electrical loads 44A, 44B, 44C, and 44D. Moreover, it should be noted that in FIG. 2, illustration of a ground wire is omitted.

The power unit 40 includes a contactor CM on the electrical power supply line ML. When the contactor CM becomes turned ON, transmission of electrical power can be performed on each of the electrical power supply lines PL. When the contactor CM becomes turned OFF, transmission of electrical power cannot be carried out on any of the electrical power supply lines PL.

The power unit 40 includes the plurality of batteries 70 which are connected in parallel with each other. Each of the plurality of batteries 70 is connected to the converter 64 via each of the electrical power supply lines PL. Each of the batteries 70, for example, is a lithium ion battery. Each of the batteries 70 is connected to the motor 62 via the converter 64.

As noted previously, in the case that the electrical power generated by the motor 62 is insufficient, the electrical power possessed by at least a portion of the plurality of batteries 70 may be supplied to the electrical loads 44. In other cases, each of the batteries 70 may be charged by the electrical power generated by the motor 62. Moreover, at the time when the internal combustion engine 60 is started, each of the batteries 70 supplies electrical power to the motor 62 that starts the internal combustion engine 60.

The power unit 40 includes diodes 72 that are arranged on each of the electrical power supply lines PL between the batteries 70 and the motor 62. The diodes 72 permit the electrical power to be supplied from the motor 62 to the batteries 70 or the electrical loads 44, and prohibits the electrical power from being supplied from the batteries 70 or the electrical loads 44 to the motor 62.

The power unit 40 includes contactors CB arranged between each of the electrical power supply lines PL and each of the batteries 70. Each of the contactors CB is capable of connecting each of the batteries 70 to each of the plurality of electrical power supply lines PL, together with being capable of interrupting such a connection. In the case that the electrical power generated by the motor 62 is insufficient with respect to the electrical power required by the electrical loads 44, and in the case that the contactors CB are turned ON, the electrical power of the batteries 70 that are connected to the contactors CB can be supplied to the electrical loads 44.

In the case that the electrical power generated by the motor 62 is greater than the electrical power required by the electrical loads 44, and in the case that the contactors CB are turned ON, due to the electrical power generated by the motor 62, it is possible to charge the batteries 70 that are connected to the contactors CB.

The power unit 40 includes contactors CL that are arranged on each of the electrical power supply lines PL between the diodes 72 and the motor 62. When the contactors CL become turned ON, transmission of the electrical power can be performed on the electrical power supply lines PL on which the contactors CL are arranged. When the contactors CL become turned OFF, transmission of the electrical power cannot be carried out on the electrical power supply lines PL on which the contactors CL are arranged.

The power unit 40 includes first switching elements 74 connected in parallel with each of the diodes 72 on each of the electrical power supply lines PL with respect to each of the batteries 70. Each of the first switching elements 74, for example, is an IGBT (Insulated Gate Bipolar Transistor). The first switching elements 74 become turned ON or OFF, in accordance with a first control signal, which will be described later, that is input to the first switching elements 74.

By the first switching elements 74 becoming turned ON, for example, at the time when the internal combustion engine 60 is started, the supply of electrical power from the batteries 70 to the motor 62 is permitted. When the first switching elements 74 become turned ON, and further, the contactors CB become turned ON, the electrical power from the batteries 70 that are connected to the contactors CB can be supplied to the motor 62. By the first switching elements 74 becoming turned OFF, supply of the electrical power from the batteries 70 to the motor 62 is prohibited.

As noted previously, the power unit 40 includes the plurality of batteries 70. The residual amount of electrical power of the plurality of batteries 70 need not necessarily be equal to each other. For example, a case may be considered in which a malfunction in which the first switching elements 74 become turned ON may occur due to the occurrence of lightning or noise. In the case that the first switching elements 74 have malfunctioned, there is a possibility that an electrical current will flow from the batteries 70 in which the residual amount of electrical power is large to the batteries 70 in which the residual amount of electrical power is small. The present embodiment employs the following configuration in order to prevent electrical current from flowing between the batteries 70 due to a malfunction of the first switching elements 74.

The control device 42 includes a plurality of battery control devices 80, an electrical power supply circuit control device 82, and a main control device 84. Each of the plurality of battery control devices 80 controls each of the batteries 70 that is connected to each of the power supply lines PL. As a specific control, each of the battery control devices 80 detects the residual amount of electrical power of each of the batteries 70, and controls charging and discharging of each of the batteries 70. As the residual amount of electrical power of each of the batteries 70, each of the battery control devices 80 may detect an SOC (State of Charge) of each of the batteries 70, or alternatively, a voltage of each of the batteries 70.

Further, each of the battery control devices 80 controls each of the aforementioned contactors CB to turn each of the contactors CB ON or OFF. Each of the battery control devices 80 controls charging and discharging of the batteries 70 by controlling each of the contactors CB. Furthermore, the battery control devices 80 output the first control signal to the first switching elements 74, for example, at the time when the internal combustion engine 60 is started.

The power unit 40 includes second switching elements 76. Each of the second switching elements 76, for example, is a relay. The second switching elements 76 are provided between each of the battery control devices 80 and each of the first switching elements 74. Consequently, the first control signal that is output from each of the battery control devices 80 is input to a control input terminal of each of the first switching elements 74 via each of the second switching elements 76. By the second switching elements 76 becoming turned ON, for example, at the time when the internal combustion engine 60 is started, the first control signal can be input to the first switching elements 74.

The electrical power supply circuit control device 82 controls the aforementioned contactor CM, and thereby turns the contactor CM ON or OFF. Further, the electrical power supply circuit control device 82 controls each of the aforementioned contactors CL, and thereby turns each of the contactors CL ON or OFF. Furthermore, the electrical power supply circuit control device 82 outputs the second control signal to the second switching elements 76, for example, at the time when the internal combustion engine 60 is started. The second switching elements 76, in accordance with the second control signal, permits an electrical connection between the electrical power supply circuit control device 82 and the control input terminals of the first switching elements 74.

The second control signal, for example, is an electrical current that flows through a non-illustrated coil. Each of the second switching elements 76 becomes turned ON or OFF by a magnetic force of the coil in accordance with the second control signal. When the second switching elements 76 become turned ON, the electrical power supply circuit control device 82 and the control input terminals of the first switching elements 74 are electrically connected. Accordingly, only in the case that the second switching elements 76 are turned ON, the first control signal output from the battery control devices 80 can be input to the control input terminals of the first switching elements 74. In such a case, the supply of electrical power from the batteries 70 to the motor 62 can be permitted.

When the second switching elements 76 become turned OFF, the electrical connection between the electrical power supply circuit control device 82 and the control input terminals of the first switching elements 74 is interrupted. Accordingly, by the second switching elements 76 becoming turned OFF, the input of the first control signal from the battery control devices 80 to the first switching elements 74 can be prohibited. In such a case, the supply of electrical power from the batteries 70 to the motor 62 is prohibited.

The main control device 84 acquires from the plurality of battery control devices 80 the residual amount of electrical power of the plurality of batteries 70. Based on the acquired residual amount of electrical power of the plurality of batteries 70, the main control device 84 controls each of the battery control devices 80 and the electrical power supply circuit control device 82, and thereby respectively turns ON or turns OFF the contactor CM, each of the contactors CL, and each of the contactors CB. In accordance with this feature, the electrical power generated by the motor 62 can be supplied to each of the batteries 70 and/or to each of the electrical loads 44.

Further, for example, at the time when the internal combustion engine 60 is started, the main control device 84 controls the battery control devices 80, and thereby causes the battery control devices 80 to output the first control signal to the first switching elements 74. Together therewith, the main control device 84 causes the electrical power supply circuit control device 82 to output the second control signal to the second switching elements 76.

In this manner, by providing the second switching elements 76, it is possible to prevent the first switching elements 74 from malfunctioning. Stated otherwise, since the first control signal is not input to the first switching elements 74 unless the electrical power supply circuit control device 82 turns ON the second switching elements 76, malfunctioning of the first switching elements 74 can be prevented.

Each of the plurality of electrical loads 44 is connected to each of the electrical power supply lines PL. Each of the electrical loads 44 includes a plurality of rotors 18, a plurality of motors 20, and a plurality of inverters 90. In FIG. 2, in order to simplify the description, each of the electrical loads 44 is shown as having one rotor 18. However, in actuality, a plurality of rotors 18 possessed by each of the electrical loads 44 includes two of the aforementioned rotors 18V, and one of the aforementioned rotors 18C.

For example, the electrical load 44A connected to the electrical power supply line PLA includes the two rotors 18V1 and 18V8 shown in FIG. 1, the one rotor 18C1, the two motors 20V1 and 20V8, and the one motor 20C1_1. The electrical load 44B connected to the electrical power supply line PLB includes the two rotors 18V4 and 18V5 shown in FIG. 1, the one rotor 18C2, the two motors 20V4 and 20V5, and the one motor 20C2_1.

The electrical load 44C connected to the electrical power supply line PLC includes the two rotors 18V2 and 18V7 shown in FIG. 1, the one rotor 18C1, the two motors 20V2 and 20V7, and the one motor 20C1_2. The electrical load 44D connected to the electrical power supply line PLD includes the two rotors 18V3 and 18V6 shown in FIG. 1, the one rotor 18C2, the two motors 20V3 and 20V6, and the one motor 20C2_2.

Each of the plurality of motors 20 included in each of the electrical loads 44 drives each of the rotors 18. Each of the plurality of inverters 90 included in each of the electrical loads 44 converts DC electrical power into AC electrical power, and supplies the AC electrical power to each of the motors 20. The electrical power converted by each of the inverters 90 is the electrical power generated by the motor 62, and further, is electrical power which is supplied by being converted by the converter 64, and/or is electrical power that is supplied from each of the batteries 70. Using the electrical power that is supplied in this manner, each of the motors 20 drives each of the rotors 18.

Figure 3:
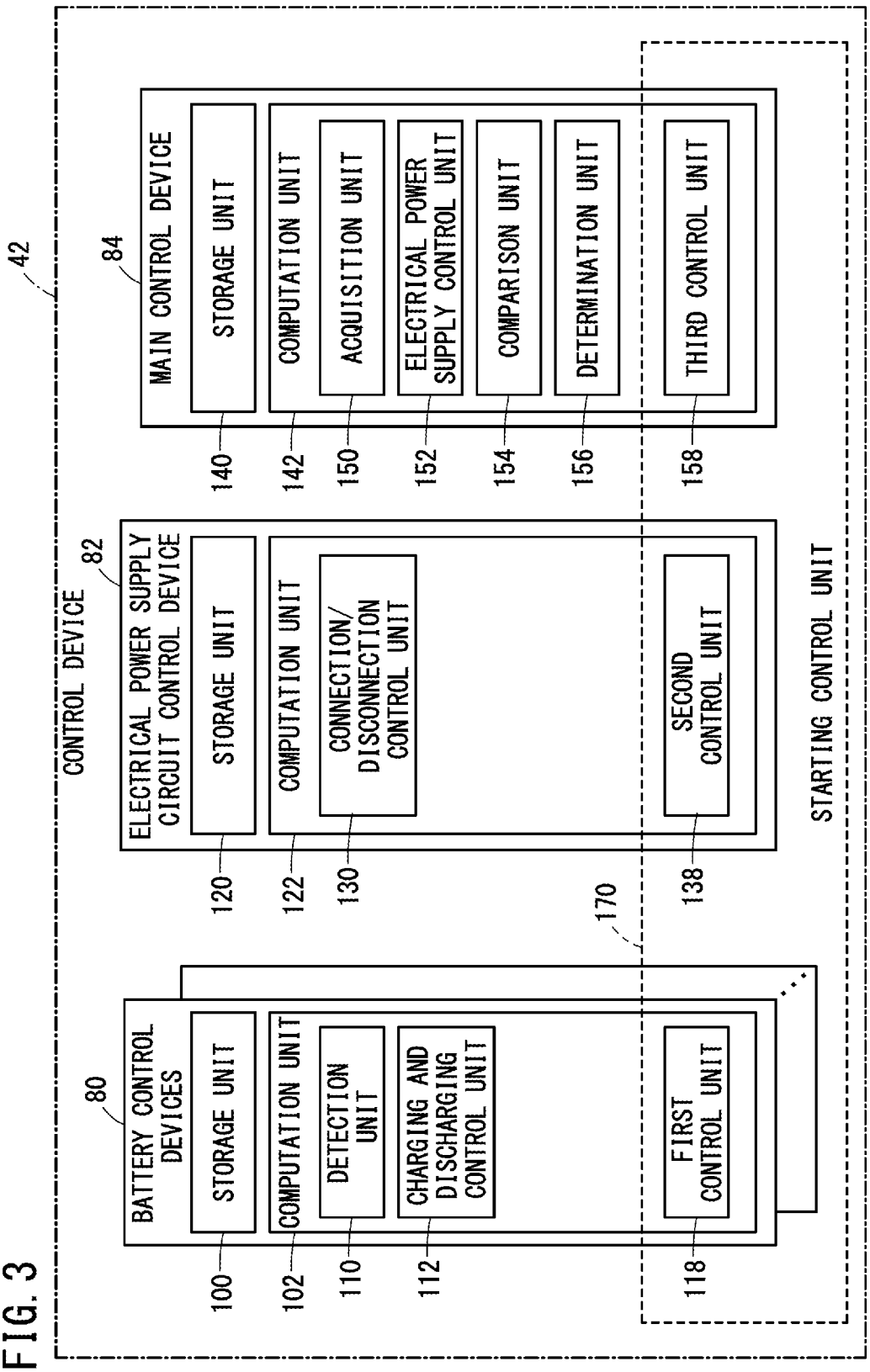
FIG. 3 is a block diagram schematically showing the configuration of the control device for the power unit.

FIG. 3 is a block diagram schematically showing the configuration of the control device 42 for the power unit 40. As noted previously, the control device 42 includes the plurality of battery control devices 80, the electrical power supply circuit control device 82, and the main control device 84. The battery control devices 80 each include a storage unit 100, and a computation unit 102. The computation unit 102 includes a processor such as a CPU (Central Processing Unit) or a GPU (Graphics Processing Unit) or the like. More specifically, the computation unit 102 includes a processing circuit (processing circuitry).

The storage unit 100 includes a volatile memory such as a RAM (Random Access Memory) or the like, and a nonvolatile memory such as a ROM (Read Only Memory) or a flash memory or the like. The volatile memory is used as a working memory for the processor. The non-volatile memory stores programs that are executed by the processor, and other necessary data.

The computation unit 102 includes a detection unit 110, a charging and discharging control unit 112, and a first control unit 118. By the computation unit 102 executing a program stored in the storage unit 100, the detection unit 110, the charging and discharging control unit 112, and the first control unit 118 are realized. At least a portion of the detection unit 110, the charging and discharging control unit 112, and the first control unit 118 may be realized by an integrated circuit such as an ASIC (Application Specific Integrated Circuit) or an FPGA (Field Programmable Gate Array) or the like, or alternatively, may be realized by an electronic circuit including a discrete device.

Using information obtained from a non-illustrated voltage sensor and/or a current sensor, neither of which are shown, the detection unit 110 detects the residual amount of electrical power of the batteries 70 that are controlled by the battery control devices 80. The detection unit 110, in accordance with an instruction from the main control device 84, issues a notification to the main control device 84 of the detected residual amount about electrical power of the batteries 70. The charging and discharging control unit 112, by controlling the contactors CB, controls charging to the batteries 70 and discharging from the batteries 70. The first control unit 118, in accordance with an instruction from the main control device 84, outputs a first control signal to the first switching elements 74.

The electrical power supply circuit control device 82 includes a storage unit 120, and a computation unit 122. The computation unit 122 includes a processor such as a CPU, a GPU, or the like. More specifically, the computation unit 122 includes a processing circuit. The storage unit 120 includes a volatile memory such as a RAM or the like, and a non-volatile memory such as a ROM, or a flash memory or the like. The volatile memory is used as a working memory for the processor. The non-volatile memory stores programs that are executed by the processor, and other necessary data.

The computation unit 122 includes a connection/disconnection control unit 130, and a second control unit 138. By the computation unit 122 executing a program stored in the storage unit 120, the connection/disconnection control unit 130, and the second control unit 138 are realized. At least a portion of the connection/disconnection control unit 130 and the second control unit 138 may be realized by an integrated circuit such as an ASIC or an FPGA or the like, or alternatively, may be realized by an electronic circuit including a discrete device.

The connection/disconnection control unit 130, by controlling the contactor CM and each of the contactors CL to be turned ON and turned OFF, controls the supply of electrical power from the motor 62 to each of the batteries 70 and/or to each of the electrical loads 44. Further, at the time when the internal combustion engine 60 is started, the connection/disconnection control unit 130, by controlling the contactor CM and each of the contactors CL, controls the supply of electrical power from each of the batteries 70 to the motor 62. The second control unit 138, in accordance with an instruction from the main control device 84, outputs a second control signal to the second switching elements 76.

The main control device 84 includes a storage unit 140, and a computation unit 142. The computation unit 142 includes a processor such as a CPU, a GPU, or the like. More specifically, the computation unit 142 includes a processing circuit. The storage unit 140 includes a volatile memory such as a RAM or the like, and a non-volatile memory such as a ROM, or a flash memory or the like. The volatile memory is used as a working memory for the processor. The non-volatile memory stores programs that are executed by the processor, and other necessary data.

The computation unit 142 includes an acquisition unit 150, an electrical power supply control unit 152, a comparison unit 154, a determination unit 156, and a third control unit 158. By the computation unit 142 executing a program stored in the storage unit 140, the acquisition unit 150, the electrical power supply control unit 152, the comparison unit 154, the determination unit 156, and the third control unit 158 are realized. At least a portion of the acquisition unit 150, the electrical power supply control unit 152, the comparison unit 154, the determination unit 156, and the third control unit 158 may be realized by an integrated circuit such as an ASIC or an FPGA or the like, or alternatively, may be realized by an electronic circuit including a discrete device.

The acquisition unit 150 acquires from the plurality of battery control devices 80 the residual amount of electrical power of the plurality of batteries 70. The electrical power supply control unit 152 controls each of the battery control devices 80, and thereby carries out a charging and discharging control for each of the batteries 70. Furthermore, the electrical power supply control unit 152 controls the electrical power supply circuit control device 82, and thereby controls the supply of electrical power from the motor 62 to each of the batteries 70 and/or to each of the electrical loads 44, as well as the supply of electrical power from each of the batteries 70 to the motor 62.

The comparison unit 154 compares the residual amount of electrical power of the plurality of batteries 70 acquired by the acquisition unit 150. The determination unit 156 determines an order of the plurality of batteries 70 in a descending order of the residual amount of electrical power thereof. The battery 70 having the maximum residual amount of electrical power is a battery 70 at a hierarchically highest position. The battery 70 having the minimum residual amount of electrical power is a battery 70 at a hierarchically lowest position. In the example shown in FIG. 2, the order of the four batteries 70A, 70B, 70C, and 70D is determined from a first position (highest position) to a fourth position (lowest position) in a descending order of the residual amount of electrical power being larger.

The third control unit 158, for example, at the time when the internal combustion engine 60 is started, determines the batteries 70 that carry out the supply of electrical power to the motor 62 based on the order of the plurality of batteries 70 determined by the determination unit 156. The third control unit 158 controls the first control unit 118 of the battery control devices 80 that control those batteries 70 that are determined, and causes the first control unit 118 to output the first control signal to the first switching elements 74.

Together therewith, the third control unit 158 controls the second control unit 138, and thereby causes the second control unit 138 to output the second control signal to the second switching elements 76. The second switching elements 76 to which the second control signal is input are arranged between the battery control devices 80 that control the batteries 70 determined in the manner described above, and the first switching elements 74 to which the first control signal is input. Furthermore, the third control unit 158 controls the converter 64, and thereby causes the internal combustion engine 60 to be started using the electrical power supplied from the batteries 70 to the motor 62.

The first control unit 118 of each of the battery control devices 80, the second control unit 138 of the electrical power supply circuit control device 82, and the third control unit 158 of the main control device 84 constitute a starting control unit 170. More specifically, the first control unit 118, the second control unit 138, and the third control unit 158 are separately provided. Accordingly, at the time when the internal combustion engine 60 is started, it is possible to cause the control load of the power unit 40 to be distributed.

At the time when the internal combustion engine 60 is started, the starting control unit 170 controls the power unit 40, and thereby starts the supply of electrical power to the motor 62 from the plurality of batteries 70 in a descending order of the residual amount of electrical power thereof being larger. In the case that the supply of electrical power from the batteries 70 to the motor 62 is permitted, the starting control unit 170 turns ON the first switching elements 74, and together therewith, turns ON the second switching elements 76. In this case, the third control unit 158, together with controlling the first control unit 118 and turning ON the first switching elements 74, also controls the second control unit 138 and turns ON the second switching elements 76.

In the case that the supply of electrical power from the batteries 70 to the motor 62 is prohibited, the starting control unit 170 turns OFF the first switching elements 74, and together therewith, turns OFF the second switching elements 76. In this case, the third control unit 158, together with controlling the first control unit 118 and turning OFF the first switching elements 74, also controls the second control unit 138 and turns OFF the second switching elements 76.

As noted previously, a case may be considered in which, due to the occurrence of lightning or noise, a malfunction occurs in which the first switching elements 74 become turned from OFF to ON. Similarly, a case may be considered in which a malfunction occurs in which the second switching elements 76 become turned from OFF to ON.

FIG. 4 is a diagram showing conditions for supplying electrical power to the motor 62 from each of the batteries 70. In the case that the first control signal input to the first switching elements 74 is OFF, irrespective of the second control signal being input to the second switching elements 76, the electrical power is incapable of being supplied from the batteries 70 to the motor 62. Accordingly, in the case that a malfunction has occurred in which the second switching elements 76 become changed from OFF to ON, any possibility that an electrical current will flow from the batteries 70 in which the residual amount of electrical power is large to the batteries 70 in which the residual amount of electrical power is small is suppressed.

In the case that the first control signal input to the first switching elements 74 is ON, and further, the second control signal input to the second switching elements 76 is OFF, the electrical power is incapable of being supplied from the batteries 70 to the motor 62. Accordingly, in the case that a malfunction has occurred in which the first switching elements 74 become changed from OFF to ON, any possibility that an electrical current will flow from the batteries 70 in which the residual amount of electrical power is large to the batteries 70 in which the residual amount of electrical power is small is suppressed.

In the case of a large difference in the residual amount of electrical power between the batteries 70, there is a concern that the batteries 70, as well as the circuit elements on the electrical power supply lines PL through which an excessive electrical current flows, may become deteriorated or damaged. By providing the second switching elements 76, even in the case that a malfunction occurs in which the first switching elements 74 become turned ON, deterioration and damage to the batteries 70 and the like can be prevented.

In the case that the first control signal input to the first switching elements 74 is ON, and further, the second control signal input to the second switching elements 76 is ON, the electrical power is capable of being supplied from the batteries 70 to the motor 62. Such a feature corresponds to a control for a case in which the supply of electrical power from the batteries 70 to the motor 62 is permitted by the starting control unit 170. In that case, the contactor CM, and the contactors CL on the electrical power supply lines PL in which the first switching elements 74 are arranged are turned ON by the connection/disconnection control unit 130. Further, the contactors CB to which the batteries 70 are connected are turned ON by the charging and discharging control unit 112.

Figure 5:
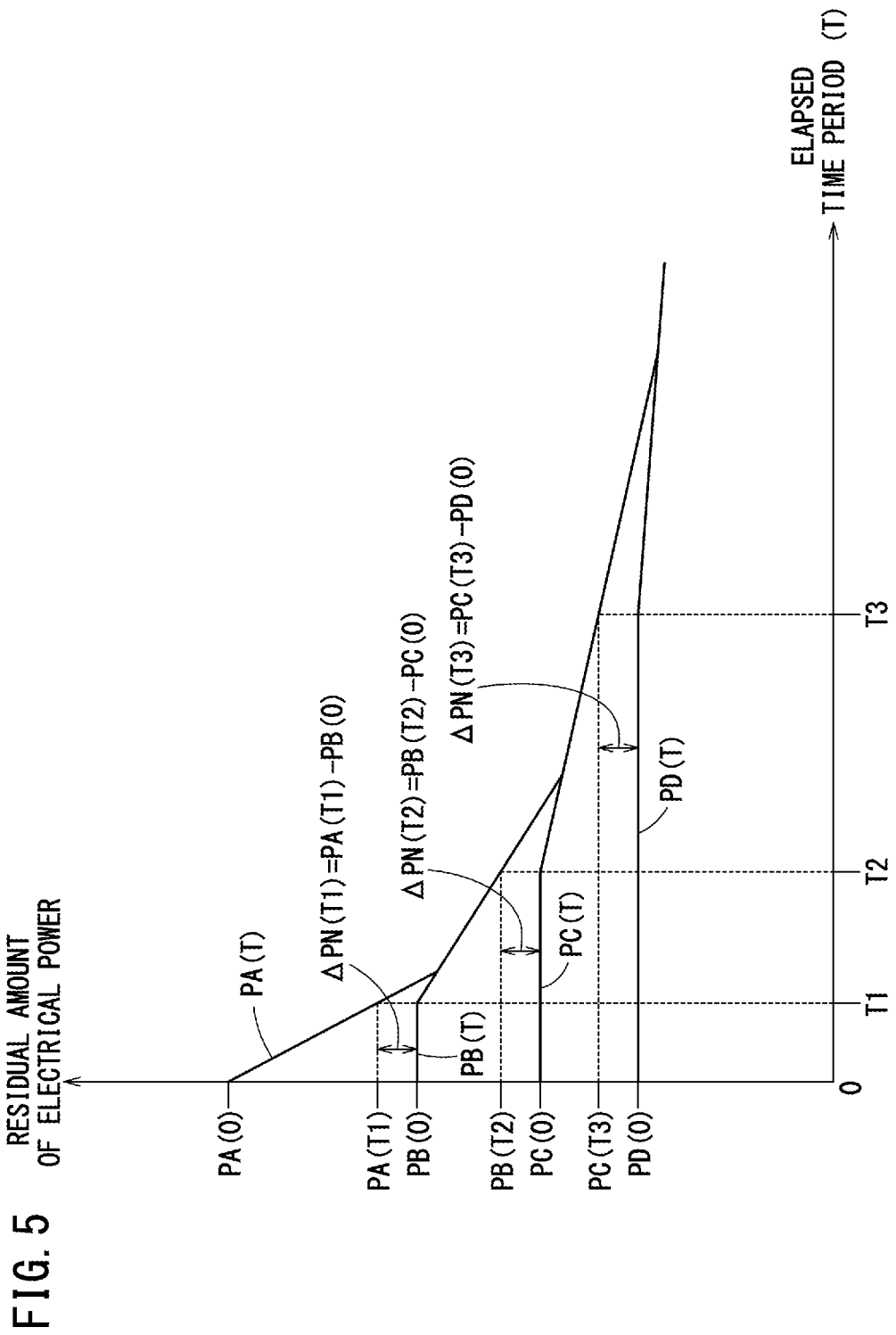
FIG. 5 is a diagram illustrating an example of changes in a residual amount of electrical power of a plurality of batteries.

At the time when the internal combustion engine 60 is started, electrical power is supplied to the motor 62 from one or more of the batteries 70. As noted previously, the third control unit 158 determines the batteries 70 that carry out the supply of electrical power to the motor 62 based on the order of the plurality of batteries 70 determined by the determination unit 156. A specific example will be described using FIG. 5. FIG. 5 is a diagram illustrating an example of changes in the residual amount of electrical power of the plurality of batteries 70.

In FIG. 5, an aspect is shown in which the residual amounts of electrical power PA(T), PB(T), PC(T), and PD(T) of the batteries 70A, 70B, 70C, and 70D shown in FIG. 2 change respectively in accordance with an elapsed time period T from the time when the internal combustion engine 60 is started. It is assumed that the order of the plurality of batteries 70 determined by the determination unit 156 is the batteries 70A, 70B, 70C, and 70D in a descending order of the residual amount of electrical power thereof being larger. More specifically, at an elapsed time period of T=0 at the time when the internal combustion engine 60 is started, a relationship of the residual amounts of electrical power being PA(0)>PB(0)>PC(0)>PD(0) holds true.

The third control unit 158 determines the battery 70 having the maximum residual amount of electrical power as being the first battery. When the first battery is determined, the third control unit 158 starts the supply of electrical power from the battery 70 that was determined as being the first battery to the motor 62. In the example shown in FIG. 5, at the elapsed time period of T=0, the third control unit 158 determines the battery 70A having the maximum residual amount of electrical power PA(0) as being the first battery. The third control unit 158 starts the supply of electrical power to the motor 62 from the battery 70A.

Further, the third control unit 158 determines the battery 70 having the next largest amount of residual electrical power as being the second battery. At the elapsed time period of T=0, the third control unit 158 determines the battery 70B having the next largest amount of residual electrical power PB(0) after the battery 70A as being the second battery.

Thereafter, in the case that a difference $\Delta PN(T)$ between the residual amount of electrical power of the first battery (the battery 70A) that has decreased, and the residual amount of electrical power of the second battery (the battery 70B) which is substantially unchanged has become less than or equal to a first predetermined amount, the third control unit 158 determines the second battery (the battery 70B) as being the first battery, and also starts the supply of electrical power to the motor 62 from the battery 70 that was determined as being the first battery.

In the example shown in FIG. 5, the residual amount of electrical power PA(T) of the battery 70A decreases until the elapsed time period T reaches T1, and the difference $\Delta PN(T)$ between the residual amount of electrical power PA(T) of the battery 70A and the residual amount of electrical power PB(T) of the battery 70B decreases. At the elapsed time period of T=T1, a difference $\Delta PN(T1)$ between the residual amount of electrical power PA(T1) of the battery 70A and the residual amount of electrical power PB(T1) of the battery 70B reaches a first predetermined amount PV1. Moreover, since the residual amount of electrical power PB(T1) of the battery 70B equals PB(0), the difference $\Delta PN(T1)$ is expressed by the equation $$\Delta PN(T1) = PA(T1) - PB(0).$$

In the case that the difference $\Delta PN(T1)$ is less than or equal to the first predetermined amount PV1, the third control unit 158 determines the battery 70B as being the first battery. The third control unit 158 starts the supply of electrical power to the motor 62 from the battery 70B. Moreover, it should be noted that the supply of electrical power from the battery 70A to the motor 62 continues without being stopped. Further, the third control unit 158 determines the battery 70 having, after the first battery, the next largest amount of residual electrical power as being the second battery. At the elapsed time period of T=T1, the third control unit 158 determines the battery 70C having the next largest amount of residual electrical power PC(T1)=PC(0) after the battery 70B as being the second battery.

Thereafter, in the case that a difference $\Delta PN(T)$ between the residual amount of electrical power of the first battery (the battery 70B) that has decreased, and the residual amount of electrical power of the second battery (the battery 70C) which is substantially unchanged has become less than or equal to a first predetermined amount PV1, the third control unit 158 determines the second battery (the battery 70C) as being the first battery, and also starts the supply of electrical power to the motor 62 from the battery 70 that was determined as being the first battery.

In the example shown in FIG. 5, until the elapsed time period T reaches the time T2 from the time T1, the residual amount of electrical power PA(T) and PB(T) of the batteries 70A and 70B decrease and the difference ΔPN(T) between the residual amount of electrical power PB(T) of the battery 70B and the residual amount of electrical power PC(T) of the battery 70C decreases. At the elapsed time period of T=T2, a difference ΔPN(T2) between the residual amount of electrical power PB(T2) of the battery 70B and the residual amount of electrical power PC(T2) of the battery 70C reaches a first predetermined amount PV1. Moreover, since the residual amount of electrical power PC(T2) of the battery 70C equals PC(0), the difference ΔPN(T2) is expressed by the equation ΔPN(T2)=PB(T2)−PC(0).

In the case that the difference ΔPN(T2) is less than or equal to the first predetermined amount PV1, the third control unit 158 determines the battery 70C as being the first battery. The third control unit 158 starts the supply of electrical power to the motor 62 from the battery 70C. Moreover, it should be noted that the supply of electrical power from the batteries 70A and 70B to the motor 62 continues without being stopped. Further, the third control unit 158 determines the battery 70 having, after the first battery, the next largest amount of residual electrical power as being the second battery. At the elapsed time period of T=T2, the third control unit 158 determines the battery 70D having the next largest amount of residual electrical power PD(T2)=PD(0) after the battery 70C as being the second battery.

Thereafter, in the case that a difference ΔPN(T) between the residual amount of electrical power of the first battery (the battery 70C) that has decreased, and the residual amount of electrical power of the second battery (the battery 70D) which is substantially unchanged has become less than or equal to a first predetermined amount PV1, the third control unit 158 determines the second battery (the battery 70D) as being the first battery, and also starts the supply of electrical power to the motor 62 from the battery 70 that was determined as being the first battery.

In the example shown in FIG. 5, until the elapsed time period T reaches the time T3 from the time T2, the residual amount of electrical power PA(T), PB(T), and PC(T) of the batteries 70A, 70B, and 70C decrease and the difference ΔPN(T) between the residual amount of electrical power PC(T) of the battery 70C and the residual amount of electrical power PD(T) of the battery 70D decreases. At the elapsed time period of T=T3, a difference ΔPN(T3) between the residual amount of electrical power PC(T3) of the battery 70C and the residual amount of electrical power PD(T3) of the battery 70D reaches a first predetermined amount PV1. Moreover, since the residual amount of electrical power PD(T3) of the battery 70D equals PD(0), the difference ΔPN(T3) is expressed by the equation ΔPN(T3)=PC(T3)−PD(0).

In the case that the difference ΔPN(T3) is less than or equal to the first predetermined amount PV1, the third control unit 158 determines the battery 70D as being the first battery. The third control unit 158 starts the supply of electrical power to the motor 62 from the battery 70D. Moreover, it should be noted that the supply of electrical power from the batteries 70A, 70B, and 70C to the motor 62 continues without being stopped.

In this manner, it is possible to smooth out the residual amounts of electrical power of the plurality of batteries 70. After starting of the internal combustion engine 60 has been completed, even in the case that the electrical current has flowed between the batteries 70 due to malfunctioning of the first switching elements 74 and the second switching elements 76, it is possible to suppress the magnitude of the electrical current. More specifically, deterioration and damage to the batteries 70 and the like caused by the electrical current between the batteries 70 can be prevented. Accordingly, the supply of electrical power from the plurality of batteries 70 to the motor 62 can be carried out more safely.

When starting of the internal combustion engine 60 is completed, the starting control unit 170 prohibits the supply of electrical power from the batteries 70 to the motor 62. More specifically, the third control unit 158, together with controlling the first control unit 118 and turning OFF the first switching elements 74, also controls the second control unit 138 and turns OFF the second switching elements 76.

Figure 6:
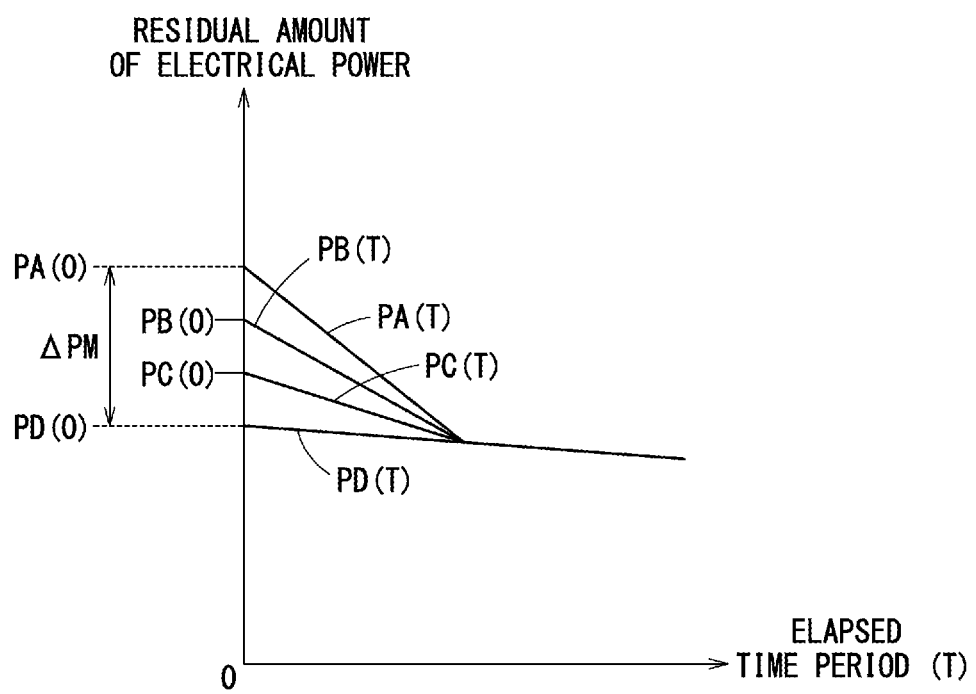
FIG. 6 is a diagram illustrating another example of changes in a residual amount of electrical power of a plurality of batteries.

At the time when the internal combustion engine 60 is started, in the case that smoothing of the residual amount of electrical power in the plurality of batteries 70 has been substantially accomplished, there is little need for the plurality of batteries 70 to start supplying electrical power to the motor 62 in a descending order of the residual amount of electrical power of the batteries being larger. In that case, the starting control may be carried out in a manner that causes the residual amount of electrical power of the plurality of batteries 70 to be different from that shown in FIG. 5. FIG. 6 is a diagram illustrating another example of changes in the residual amount of electrical power of the plurality of batteries 70.

In FIG. 6, an aspect is shown in which the residual amounts of electrical power PA(T), PB(T), PC(T), and PD(T) of the batteries 70A, 70B, 70C, and 70D shown in FIG. 2 change respectively in accordance with an elapsed time period T from the time when the internal combustion engine 60 is started. It is assumed that the order of the plurality of batteries 70 determined by the determination unit 156 is determined to be the batteries 70A, 70B, 70C, and 70D in a descending order of the residual amount of electrical power thereof being larger. More specifically, at an elapsed time period of T=0 at the time when the internal combustion engine 60 is started, a relationship of the residual amounts of electrical power being PA(0)>PB(0)>PC(0)>PD(0) holds true.

The third control unit 158 calculates a difference ΔPM in the residual amount of electrical power between the battery 70 having the maximum residual amount of electrical power and the battery 70 having the minimum residual amount of electrical power. In the example shown in FIG. 6, at an elapsed time period of T=0, the difference ΔPM is equal to the difference between the residual amount of electrical power PA(0) of the battery 70A and the residual amount of electrical power PD(0) of the battery 70D. More specifically, the difference ΔPM is expressed by the equation ΔPM=PA(0)−PD(0).

In the case that the difference ΔPM is less than or equal to the second predetermined amount PV2, the third control unit 158 starts the supply of electrical power to the motor 62 from all of the plurality of batteries 70A, 70B, 70C, and 70D. In that case, since the starting control becomes simpler, the processing load on the starting control unit 170 is reduced.

When starting of the internal combustion engine 60 is completed, the starting control unit 170 prohibits the supply of electrical power from the batteries 70 to the motor 62. More specifically, the third control unit 158, together with controlling the first control unit 118 and turning OFF the first switching elements 74, also controls the second control unit 138 and turns OFF the second switching elements 76.

FIG. 7 is a flowchart showing a processing procedure in relation to a control method for the power unit 40. Such a processing procedure is performed, for example, by the computation unit 142 included in the main control device 84. When an instruction is issued from the user to start the internal combustion engine 60, the present processing procedure is initiated. In step S1, the acquisition unit 150 instructs the plurality of battery control devices 80 in a manner so as to issue a notification concerning the residual amount of electrical power of the plurality of batteries 70. The detection unit 110 of each of the battery control devices 80 issues a notification to the acquisition unit 150 of the detected residual amount of electrical power of each of the batteries 70.

In step S2, the comparison unit 154 compares the residual amount of electrical power of the plurality of batteries 70 acquired by the acquisition unit 150. In step S3, the determination unit 156 determines an order of the plurality of batteries 70 in a descending order of the residual amount of electrical power thereof being larger. In step S4, the third control unit 158 determines whether or not the difference ΔPM between the maximum residual amount of electrical power and the minimum residual amount of electrical power is less than or equal to a second predetermined amount PV2. In the case it has become YES in step S4, the present processing procedure proceeds to step S31. In the case it has become NO in step S4, the present processing procedure proceeds to step S5.

In step S5, the third control unit 158 determines the battery 70 having the maximum residual amount of electrical power as being the first battery. In step S6, the third control unit 158 starts the supply of electrical power from the first battery to the motor 62. In step S7, the third control unit 158 determines whether or not the supply of electrical power from all of the plurality of batteries 70 to the motor 62 has been started. In the case it has become YES in step S7, the present processing procedure comes to an end. In the case it has become NO in step S7, the present processing procedure proceeds to step S8.

In step S8, the third control unit 158 determines the battery 70 having, after the first battery, the next largest residual amount of electrical power as being the second battery. In step S9, the third control unit 158 determines whether or not the difference ΔPN(T) between the residual amount of electrical power of the first battery and the residual amount of electrical power of the second battery has become less than or equal to the first predetermined amount PV1. In the case it has become YES in step S9, the present processing procedure proceeds to step S10. In the case it has become NO in step S9, the present processing procedure repeats the process of step S9.

In step S10, the third control unit 158 determines the second battery as being the first battery. In the case that the process of step S10 is completed, the present processing procedure returns to step S6.

As noted previously, in the case it has become YES in step S4, the present processing procedure proceeds to step S31. In step S31, the third control unit 158 starts the supply of electrical power from all of the plurality of batteries 70 to the motor 62. In the case that the process of step S31 is completed, the present processing procedure comes to an end.

[Inventions that can be Obtained from the Embodiment]

Concerning the inventions that are capable of being grasped from the above-described embodiment, the following supplementary notes are disclosed.

Supplemental Note 1

In the control device (42) for the power unit (40) connected to the motor (62) that starts the internal combustion engine (60), the power unit includes the plurality of batteries (70) connected in parallel with each other and which serve to supply the electrical power from the plurality of batteries to an electrical load (44) other than the motor, the control device comprising the detection unit (110) that detects the residual amount of electrical power (PA, PB, PC, and PD) of each of the plurality of batteries, the comparison unit (154) that compares the residual amount of electrical power of the plurality of batteries, and the starting control unit (170) which, at a time when the internal combustion engine is started, controls the power unit, and thereby starts supplying the electrical power from the plurality of batteries to the motor in a descending order of the residual amount of electrical power of the batteries. In accordance with such features, it is possible to smooth out the residual amounts of electrical power of the plurality of batteries. Therefore, deterioration and damage to the batteries and the like caused by the electrical current between the batteries can be prevented.

Supplemental Note 2

In the control device for the power unit according to Supplemental note 1, the plurality of batteries may include the first battery, and the second battery having a next highest residual amount of electrical power after the first battery, in the control device, after having started supplying the electrical power to the motor from the first battery, in the case that the difference (ΔPN) between the residual amount of electrical power of the first battery and the residual amount of electrical power of the second battery has become less than or equal to the first predetermined amount (PV1), the one or more processors may cause the control device to start supplying the electrical power from the second battery to the motor. In accordance with this feature, the supply of electrical power from the plurality of batteries to the motor can be carried out more safely.

Supplemental Note 3

In the control device for the power unit according to Supplemental note 1 or 2, among the plurality of batteries, in the case that the difference in the residual amount of electrical power (ΔPM) between the battery having the maximum residual amount of electrical power and the battery having the minimum residual amount of electrical power is less than or equal to the second predetermined amount (PV2), the one or more processors may cause the control device to start supplying the electrical power from all of the plurality of batteries to the motor. In accordance with this feature, the processing load on the starting control unit 170 is reduced.

Supplemental Note 4

In the control device for the power unit according to Supplemental note 1, after the internal combustion engine has been started, the motor may function as a generator that serves as an electrical power source for the plurality of batteries or the electrical load. In accordance with this feature, the moving body can be made smaller in scale and lighter in weight.

Supplemental Note 5

In the control device for the power unit according to Supplemental note 4, the power unit may comprise the diodes (72) disposed between the batteries corresponding to each of the plurality of batteries and the motor, and that permits the electrical power to be supplied from the motor to the batteries or the electrical load, the first switching elements (74) which, together with being connected with respect to the batteries in parallel with the diode, include the control input terminals that input the first control signal from the control device, and which permit the supply of electrical power from the batteries to the motor in accordance with the first control signal, and the second switching elements (76) that permit the electrical connection between the control device and the control input terminals in accordance with the second control signal, wherein, in the control device, the one or more processors, by causing the first control signal to be output to the first switching elements, and causing the second control signal to be output to the second switching elements, causes the supply of electrical power from each of the plurality of batteries to the motor to be started. In accordance with such features, deterioration and damage to the batteries and the like can be prevented.

Supplemental Note 6

In the control device for the power unit according to Supplemental note 5, the starting control unit may include the first control unit (118) that outputs the first control signal to the first switching elements, the second control unit (138) that outputs the second control signal to the second switching elements, and the third control unit (158) which, together with controlling the first control unit, and the first control unit causing the first control signal to be output to the first switching elements, controls the second control unit, and causes the second control unit to output the second control signal to the second switching elements, wherein the first control unit, the second control unit, and the third control unit are separately provided. In accordance with such features, at the time when the internal combustion engine is started, it is possible to cause the control load of the power unit to be distributed.

Supplemental Note 7

In the control method for the power unit connected to the motor that starts the internal combustion engine, the power unit includes the plurality of batteries connected in parallel with each other and which serve to supply the electrical power from the plurality of batteries to an electrical load other than the motor, wherein the control method comprises the detection step of detecting the residual mount of electrical power of each of the plurality of batteries, the comparison step of comparing the residual amount of electrical power of the plurality of batteries, and the starting control step which, at a time when the internal combustion engine is started, controls the power unit, and thereby starts supplying the electrical power from the plurality of batteries to the motor in a descending order of the residual amount of electrical power of the batteries being larger. In accordance with such features, it is possible to smooth out the residual amounts of electrical power of the plurality of batteries. Therefore, deterioration and damage to the batteries and the like caused by the electrical current between the batteries can be prevented.

Moreover, it should be noted that the present invention is not limited to the embodiments described above, but a variety of configurations may be adopted therein without departing from the essence and gist of the present invention.

The invention claimed is:

1. A control device for a power unit connected to a motor configured to start an internal combustion engine, the power unit having a plurality of batteries connected in parallel with each other and which are configured to supply electrical power from the plurality of batteries to an electrical load other than the motor, the control device comprising one or more processors configured to execute computer executable instructions stored in a memory, wherein the one or more processors execute the computer executable instructions to cause the control device to:
detect a residual amount of electrical power of each of the plurality of batteries;
compare the residual amount of electrical power of the plurality of batteries; and
at a time when the internal combustion engine is started, control the power unit and start supplying the electrical power from the plurality of batteries to the motor in a descending order of the residual amount of electrical power of the batteries, wherein:
the plurality of batteries include a first battery, and a second battery having a next highest residual amount of electrical power after the first battery; and
the one or more processors causes the control device to start supplying the electrical power from the second battery to the motor in a case that a difference between the residual amount of electrical power of the first battery and the residual amount of electrical power of the second battery becomes less than or equal to a first predetermined amount after the one or more processors cause the control device to start supplying the electrical power to the motor from the first battery.

2. The control device for the power unit according to claim 1, wherein, in a case that a difference in a residual amount of electrical power between a battery having a maximum residual amount of electrical power and a battery having a minimum residual amount of electrical power among the plurality of batteries is less than or equal to a second predetermined amount, the one or more processors cause the control device to start supplying the electrical power from all of the plurality of batteries to the motor.

3. The control device for the power unit according to claim 1,
wherein after the internal combustion engine has been started, the motor functions as a generator that serves as an electrical power source for the plurality of batteries or the electrical load.

4. The control device for the power unit according to claim 3, wherein the power unit comprises:
a diode disposed between the motor and the batteries corresponding to each of the plurality of batteries, and configured to permit the electrical power to be supplied from the motor to the batteries or the electrical load;
a first switching element which, together with being connected with respect to the batteries in parallel with the diode, includes a control input terminal where a first control signal is input from the control device, and is configured to permit the supply of electrical power from the batteries to the motor in accordance with the first control signal; and
a second switching element configured to permit an electrical connection between the control device and the control input terminal in accordance with a second control signal;
wherein, the one or more processors cause the control device to output the first control signal to the first switching element, and to output the second control signal to the second switching element, thereby causing the control device to start the supply of electrical power from each of the plurality of batteries to the motor.

5. The control device for the power unit according to claim 4, comprising:
a battery control device;
an electrical power supply circuit control device; and
a main control device;

wherein:
the one or more processors include a processor for the battery control device, a processor for the electrical power supply circuit control device, and a processor for the main control device
the processor of the battery control device causes the battery control device to output the first control signal to the first switching element;
the processor of the electrical power supply circuit control device causes the electrical power supply circuit control device to output the second control signal to the second switching element;
the processor of the main control device
controls the processor of the battery control device and causes the battery control device to output the first control signal to the first switching element, and
controls the processor of the electrical power supply circuit control device and causes the electrical power supply circuit control device to output the second control signal to the second switching element; and
the processor of the battery control device, the processor of the electrical power supply circuit control device, and the processor of the main control device are separately provided.

6. A control method for a power unit connected to a motor configured to start an internal combustion engine, the power unit having a plurality of batteries connected in parallel with each other and being configured to supply electrical power from the plurality of batteries to an electrical load other than the motor, the control method comprising:
detecting a residual amount of electrical power of each of the plurality of batteries;
comparing the residual amount of electrical power of the plurality of batteries; and
at a time when the internal combustion engine is started, controlling the power unit and starting to supply the electrical power from the plurality of batteries to the motor in a descending order of the residual amount of electrical power of the batteries,
wherein:
the plurality of batteries include a first battery, and a second battery having a next highest residual amount of electrical power after the first battery; and
the method further comprises starting to supply the electrical power from the second battery to the motor in a case that a difference between the residual amount of electrical power of the first battery and the residual amount of electrical power of the second battery becomes less than or equal to a first predetermined amount after starting to supply the electrical power to the motor from the first battery.

* * * * *